United States Patent [19]

Luetzelschwab

[11] Patent Number: 4,617,991
[45] Date of Patent: * Oct. 21, 1986

[54] POLYMER FLOW CONTROL APPARATUS

[75] Inventor: Wayne E. Luetzelschwab, Littleton, Colo.

[73] Assignee: Marathon Oil Company, Findlay, Ohio

[*] Notice: The portion of the term of this patent subsequent to Aug. 20, 2002 has been disclaimed.

[21] Appl. No.: 746,219

[22] Filed: Jun. 18, 1985

Related U.S. Application Data

[63] Continuation of Ser. No. 515,416, Jul. 20, 1983, Pat. No. 4,535,844.

[51] Int. Cl.$^4$ .............. E21B 43/22; E21B 47/00
[52] U.S. Cl. .................... 166/53; 166/65.1; 166/91; 166/252; 290/43; 290/54
[58] Field of Search ........... 166/250, 252, 273, 274, 166/275, 305 R, 53, 65 R, 66, 95 R, 91; 290/52, 54, 43; 417/46, 47

[56] References Cited

U.S. PATENT DOCUMENTS

| | | |
|---|---|---|
| 3,034,526 | 5/1962 | Roselle . |
| 3,128,794 | 4/1964 | Boucher et al. . |
| 3,353,564 | 11/1967 | Bergeijk et al. . |
| 3,945,402 | 3/1976 | Murphy . |
| 4,132,269 | 1/1979 | Chasteen ................ 166/268 |
| 4,134,024 | 1/1979 | Wiseman ............. 290/54 X |
| 4,204,574 | 5/1980 | Stalder ................ 166/53 X |
| 4,276,482 | 6/1981 | Crockett ................ 290/52 |
| 4,281,970 | 8/1981 | Stewart et al. ........ 417/47 X |
| 4,436,487 | 3/1984 | Purvis et al. ............ 417/46 |
| 4,510,993 | 4/1985 | Luetzelschwab ...... 166/305 R X |
| 4,535,844 | 8/1985 | Luetzelscwab ............ 166/252 |

*Primary Examiner*—George A. Suchfield
*Attorney, Agent, or Firm*—Jack L. Hummel; Rodney F. Brown

[57] ABSTRACT

Flow control of a diluted polymer solution stream is effected by utilizing positive-displacement flow devices such as hydraulic pumps and motors to withdraw energy from the stream and to use it to control the rate of flow of the stream in a manner to prevent, or minimize, degradation of the polymer comprising the solution. Flow control is obtained by varying the nature and amount of energy withdrawn, by means of an air compressor in one form of the system.

6 Claims, 4 Drawing Figures

POLYMER FLOW CONTROL APPARATUS

This is a continuation application of copending U.S. patent application Ser. No. 515,416 filed on July 20, 1983, now U.S. Pat. No. 4,535,844.

TECHNICAL FIELD

The present invention relates to apparatus for controlling the flow of polymer solutions while minimizing degradation of the polymer and, in particular, to apparatus utilizable for the on-site flow control of diluted solutions of a partially hydrolyzed polyacrylamide for use in the secondary and tertiary recovery of oil from subterranean formations.

BACKGROUND OF THE PRIOR ART

Use of aqueous solutions of polymers such as a partially hydrolyzed polyacrylamide (PHPA) to recover residual oil from oil-bearing subterranean formations is well known. In secondary recovery operations, after normal drilling and pumping operations, the subterranean formation is flooded through an input well with a polymer solution and the resulting admixture of polymer solution and oil is forced to an output well head where it is pumped from the ground. In tertiary operations, recovery of residual oil is first accomplished by flooding the rock formation with water and, thereafter, flooding with a polymer solution.

Through extensive research in the use of polymer solutions in secondary and tertiary oil recovery operations, it has been discovered that a polymer solution can be tailor-made, so to speak, to meet the performance demands of substantially any oil-bearing subterranean formation. More specifically in this connection, it has been found that such considerations as the average molecular weight and the molecular weight distribution properties of a polymer comprising the polymer solution can significantly augment and enhance oil recovery thereby resulting in important reductions in recovery costs.

In the case of solutions of PHPA, care must be taken in formulating, diluting and handling the solutions in order to limit the breaking up or "degrading" of the polymer and thus to preserve to the greatest extent possible its preselected average molecular weight and molecular weight distribution properties. The on-site and on-demand production and use of PHPA accentuates the problem of polymer degradation.

Apparatus for the production and dilution of PHPA may be maintained on a continuous basis. The direction and control of flow of the aqueous PHPA as it is transported to the point of injection into an oil-bearing formation are critical in maintaining the integrity of the polymer. Mechanical stress, such as that induced by abrupt changes in flow direction, turbulent flow, and travel through partially closed valves or other flow control devices contribute to the degradation of the polymer solution, and adversely affect such properties as the polymer's mobility, injectivity, brine tolerance, and resistance to further thinning induced by shear forces.

The systems presently used to prepare and inject aqueous PHPA solutions for oil recovery purposes can be preassembled and mounted on skids, for example, for ready transport to and from a site where recovery is to take place. Such a system may include a monomer supply, a source of water, polymerization apparatus, catalyst feed and monitoring equipment, hydrolyzation apparatus including means for feeding a controlled amount of a hydrolyzing agent into the polymer stream, and apparatus for diluting the hydrolyzed polymer and injecting it into an input well penetrating a reservoir of interest.

A system of this type is capable of producing a broad spectrum of polymers of varying average molecular weight and molecular weight distribution to meet the permeability demands of substantially any oil-bearing formation being worked. Once the parameters are determined, the system can produce a polymer having the desired properties. The present invention is intended to maintain the preselected characteristics of the polymer solution as the solution is moved through a system to the input well, while enabling the rate of solution flow to be properly controlled.

In the past, flow control expedients have included varying the length of pipe through which the polymer solution is transported or the use of sand packs. These techniques are unsatisfactory because they are cumbersome, and require much time and labor to effect flow changes.

Other prior art efforts involving the manufacture and transport of polymer solutions have not addressed the particular problems solved by the present invention.

U.S. Pat. No. 3,034,526, for example, describes a three-dimensional T-shaped cascade system intended to prevent the degrading of molten, highly viscous linear polymers such as nylon, but does not teach a simple and efficacious manner to vary polymer flow rates while avoiding degradation.

U.S. Pat. No. 3,128,794 describes apparatus for moving molten polymers through pipe lines and using inverters positioned in the flow path of the polymer to equalize residence time between the polymer flow segment at the outer periphery of the pipe line and the flow segment at the center of the pipe line. The patent merely teaches the diversion of polymer flowing along the conduit walls toward the conduit center, and vice versa, without controlling the rate of flow. A similar consideration, pipeline residence time, is addressed in U.S. Pat. No. 3,353,564, which uses a plurality of screens spaced apart one from the other and placed in the material flow path. The positioning of such screens is intended to prevent thermal degradation of the polymer by flattening the velocity profile of the polymer to equalize flow rates rather than to set flow rates.

U.S. Pat. No. 3,945,402 teaches a pipe system incorporating turbulence control apparatus which includes spaced-apart screens positioned within a tapered pipe run. The internal wall roughness of the '402 apparatus is selected to achieve laminar flow at Reynolds numbers in excess of 2200. Although use of valves and pumps in the system is described, no teaching is found concerning use of a system to control the transport of mechanically degradable polymer solutions.

BRIEF DESCRIPTION OF THE PRESENT INVENTION

In accordance with the present invention, apparatus is provided to control the flow of aqueous polymer solutions, such as PHPA, in a manner to effectively minimize polymer degradation. The apparatus employed allows for efficient and effective flow control without requiring time-consuming changes in pipeline length, or use of inefficient sand packs. In addition, the apparatus finds particular application in on-site liquid transport systems which can be set up in the field, and easily moved or rearranged. The improved results in flow control are thus achieved at little expense without requiring specialized equipment.

To this end, the apparatus described herein utilizes a positive-displacement fluid activated means positioned strategically along the path of flow of the polymer solution. Examples of such positive-displacement fluid activated means are flow meters, such as oval gear meters, birotor meters, or oscillating piston meters, pumps such as piston pumps, gear pumps, diaphragm pumps, or vane pumps; and hydraulic motors such as gear motors, piston motors, or vane motors.

Flow control is obtained by varying the rate at which energy is removed from the polymer stream by the fluid activated means. Control of such energy removal can occur in many forms, such as translating the rotational or shaft work imparted to the fluid activated device to a different form of energy. One example is to utilize a hydraulic motor as the fluid activated means, and to couple the output of the motor to a variable load means such as an air compressor. Varying the discharge pressure of the compressor by a regulator means such as a valve acts to control the extraction of energy from the polymer stream, and thus the rate of flow of the stream across the motor. Another example of a variable load means is a liquid pump coupled to the output of the motor which pumps a liquid against a variable, controlled, discharge pressure. Varying the discharge pressure acts to control the extraction of energy from the polymer stream, and thus the flow of the stream across the motor. Yet another example of a variable load means is an electric generator coupled to the output of the motor with a variable, controlled external electrical load. Varying the electrical load acts to control the extraction of energy from the polymer stream, and thus the flow of the stream across the motor.

In accordance with another aspect of the present invention the energy output of the polymer stream is utilized as a source of power. In one such example, where the fluid activated means is coupled to an air compressor, the output of the compressor can be used to power the valve and automatically regulate the polymer flow across a gear motor, for example. If the energy is extracted as a pressurized liquid, that pressure can be used to operate a hydraulic control valve or converted to heat and used to heat a building. If the energy is extracted as electrical energy, the electricity can be used to power an electric control valve, to light lights, or converted to heat to heat a building.

Mechanical loads may also be coupled to the output of the fluid activated means, and thus used to absorb the work extracted from the flowing polymer stream.

As stated, the apparatus is especially useful for transporting dilute aqueous PHPA solutions to the injection point in a subterranean oil-bearing formation for displacement recovery of oil, particularly where the PHPA solution is prepared and diluted at the oil recovery site.

The foregoing, and other features and advantages of the present invention will become more apparent upon consideration of the following decription and the accompanying drawings.

DETAILED DESCRIPTION OF THE INVENTION

While the present invention finds utility in the flow control of various polymer solutions, generally, the embodiments shown and described herein have special utility for controlling the flow of aqueous solutions of PHPA in conjunction with secondary and tertiary oil-recovery procedures.

The on-site preparation of aqueous PHPA solutions involves the steps of polymerizing an acrylamide monomer in the presence of a suitable initiator or catalyst, preferably a co-mixture of ammonium persulfate and sodium bisulfite. After polymerization is complete, partial hydrolysis is carried out by adding to the polymer an amount of monovalent base, such as sodium hydroxide or potassium hydroxide, sufficient to hydrolyze about 20 to about 40 mole percent of the amide groups. Following hydrolyzation, the solution is diluted to about 1% or about 2% for temporary storage or for immediate injection into an input well. Careful regulation of the polymerization process produces aqueous PHPA solutions of predetermined properties which are matched to the performance demands of oil-bearing formation of interest. Eventual transport to the well site for injection must then be accomplished in such a manner as to minimize any polymer degradation.

Figure 1:
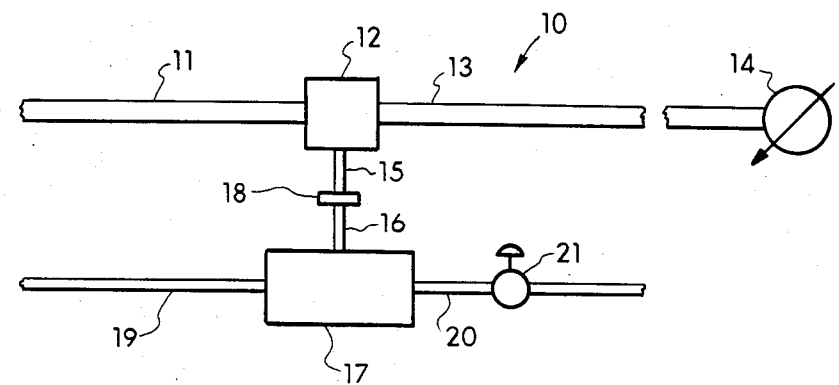
FIG. 1 is a schematic diagram of one embodiment of the present invention utilizing a hydraulic motor and air compressor in a non-automatic system.

Referring now to FIG. 1 of the drawings, the numeral 10 indicates generally a schematic representation of one embodiment of flow control apparatus of the present invention. An aqueous polymer solution diluted as described hereinabove, to a concentration of about 1-2%, flows through polymer inlet 11 to a positive displacement fluid activated means, in this case a hydraulic motor 12, and thence to polymer outlet 13. All the flow control apparatus are located at the surface, i.e., ground level. From the polymer outlet, the polymer solution is directed to a well head 14 for injection into a subterranean oil-bearing reservoir.

Motor 12 may be of the type having one or more gears designed to be actuated by the passage of fluid therethrough. Other hydraulic motors, such as those of the piston type, or vane type, may also be employed. An important consideration is to have the internal structure and geometry of the hydraulic motor such that passage therethrough of the polymer solution does not induce polymer degradation.

In order to control the rate of flow of the polymer solution, and to effect a pressure drop across the motor 12, drive means are provided in motor 12 to extract energy from the polymer stream as it passes through motor 12. The drive means are described below in greater detail with reference to FIG. 3.

In more conventional flow systems, flow control is accomplished through use of control valves, the closing of which presents progressively increased physical resistance. Such techniques are not suited for use with polymer solutions of the type and for the use hereinabove described, unless specifically designed to minimize polymer degradation, because such resistance can result in excessive degradation of the polymer.

As shown schematically in FIG. 1, the drive means of motor 12 is engaged to output means comprising output shaft 15 of motor 12 coupled by coupling 18 to input shaft 16 of a variable load means represented here by an air compressor 17. The output means is to the drive means such that compressor 17 is driven by motor 12 responsive to the passage of polymer solution through motor 12. Air enters compressor 17 via air inlet 19, and is discharged through outlet 20. The rate at which energy is transmitted from the flowing polymer stream may be regulated by varying the pressure to which air entering the inlet 19 is compressed prior to discharge from the compressor. One manner in which this may be done is to position a regulator means such as a control valve 21 in the outlet 20 to regulate the output pressure. Thus, by way of illustration, under an observed set of flow conditions, the air pressure of outlet 20 of compressor 17 was maintained at 14 psig, which resulted in a 110 psig pressure drop of the polymer stream across motor 12, a polymer stream rate of 2.8 gpm, and an output shaft 15 speed of about 820 rpm. When control valve 21 was opened to reduce the pressure at outlet 20 of compressor 17 to 2 psig, the pressure drop across motor 12 decreased to 66 psig, the polymer stream rate increased to 4.3 gpm, and the output shaft 15 speed increased to about 1220 rpm. In both cases, minimal polymer degradation was observed.

Varying the pressure drop across motor 12 produced the following results with respect to changes in polymer solution viscosity. Samples were drawn upstream and downstream from motor 12, and the viscosities determined on a Brookfield viscometer, 6 rpm at 72° F. with a UL adaptor:

| Pressure drop across motor (psi) | Flow rate (gpm) | Changes in Viscosity | |
|---|---|---|---|
| | | Upstream (cp) | Downstream (cp) |
| 66 | 4.3 | 65.1 | 65.7 |
| 72 | 5.0 | 60.3 | 59.1 |
| 88 | 6.0 | 59.3 | 59.3 |
| 91 | 5.9 | 64.7 | 64.3 |
| 110 | 2.8 | 65.1 | 63.3 |
| 150 | 3.6 | 60.2 | 59.7 | where
psi=pounds per square inch
gpm=gallons per minute
cp=centipoise

The zero, or slight, changes in viscosity, even at a pressure drop of 150 psig across the pump, indicates that no, or minimal, degradation of the polymer in the aqueous solution took place.

Figure 2:
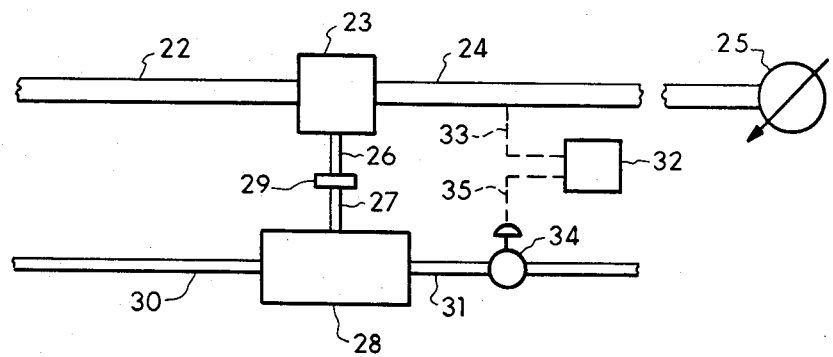
FIG. 2 is a schematic diagram of the components of FIG. 1 arranged in an automatic system.

Referring now to FIG. 2 of the drawings, a modified version of the embodiment shown in FIG. 1 enables automatic control of the flow process.

Polymer solution enters inlet 22 to motor 23, and exits at outlet 24, eventually to be injected into a well head 25. A shaft 26, driven by the motor 12, is coupled to a shaft 27 of a compressor 28 by a coupling 29. Air entering compressor 28 at inlet 30 is compressed and exits via outlet 31.

A monitoring means 32 monitors flow through polymer outlet 24 via flow metering means 33, and controls the pressure at air outlet 31 by opening and closing the regulator means, a control valve 34, responsive to signals traveling along control line 35. If motor 23 is suitable to meter the flow rate, meter 33 can be omitted and the flow rate indication to monitoring means 32 can come directly from motor 23. The polymer flow rate is controlled by monitoring means 32 which compares the actual flow measurement from flow meter 33 or from motor 23 with the desired flow set by plant personnel and changes valve 34 to extract more or less energy, as needed, to give the desired flow rate.

Figure 3:
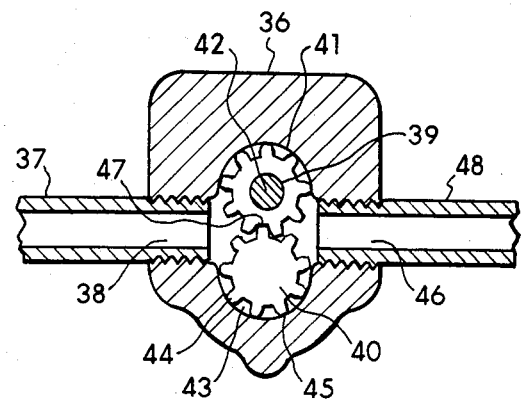
FIG. 3 is a schematic view exemplary of a gear motor having utility in the practice of the invention.

Referring next to FIG. 3 of the drawings, there is depicted a schematic representation of a hydraulic gear motor 36 suitable for use as the positive displacement fluid activated means in the practice of the present invention. Incoming PHPA solution is directed to inlet 37, and enters motor inlet chamber 38. Upper gear 39 and lower gear 40 are rotatably mounted within motor housing 41, with upper gear 39 keyed to output shaft 42 analogous to shafts 15 and 26 of FIGS. 1 and 2 respectively. Gears 39 and 40 comprise the drive means and shaft 42 comprises the output means referenced above.

In the embodiment of the motor depicted, upper gear 39 rotates in a clockwise direction, while lower gear 40 moves in counter clockwise direction when contacted by incoming polymer solution. Individual increments or "bites" of solution are trapped between adjacent gear teeth, as in space 43 between teeth 44 and 45, and are carried along as said teeth are "wiped" along the inner periphery of motor housing 41. As the solution reaches motor outlet chamber 46, the meshing of gears 39 and 40, at 47, forces the solution to outlet 48. Rotation of shaft 42 provides motive force for the energy-absorbing variable load means selected to modulate flow of the solution.

Exemplary of a motor useful for the purposes of the present invention is a fixed-displacement hydraulic gear motor manufactured by the Viking Pump Division of Houdaille Industries, Cedar Falls, Iowa, under the model designation GP-0514, and having a capacity of 3.22 gallons/minute at 1,000 rpm.

Figure 4:
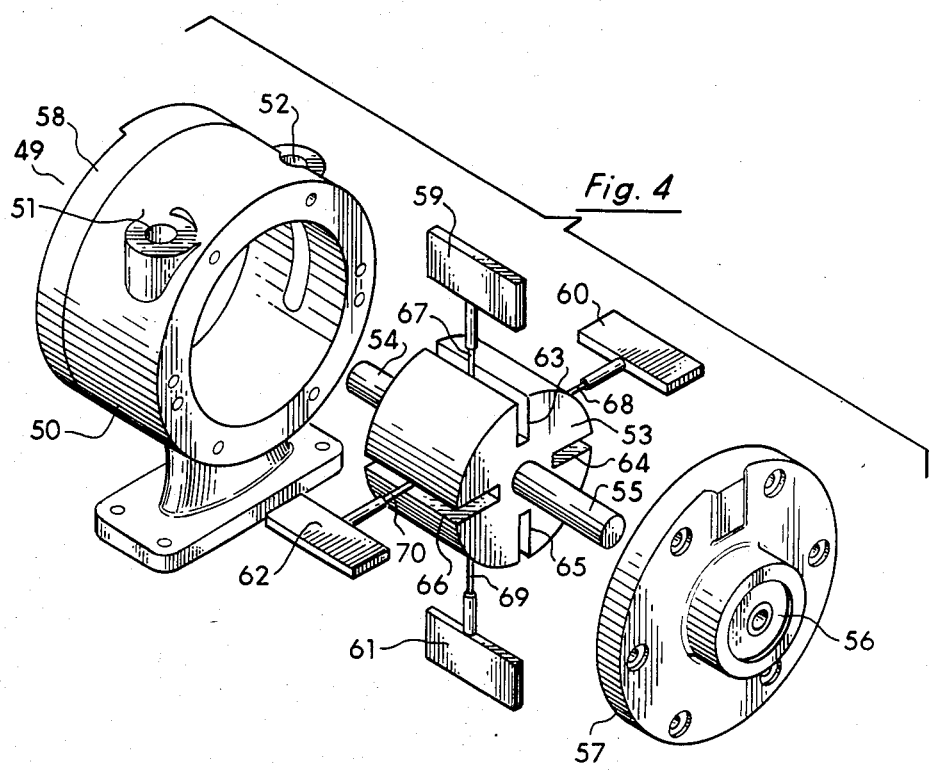
FIG. 4 is an exploded perspective view illustrating an air compressor of a type having utility in the practice of the present invention.

Referring now to FIG. 4 of the drawings, the numeral 49 indicates generally an air motor/compressor of the general type useful as the variable load means in the practice of the present invention. Housing 50 has inlet 51 and outlet 52 formed thereon. Rotor 53 is mounted to rotor shafts 54 and 55, which are supported in bearing assemblies 56, mounted in end plates 57 and 58.

The interior of housing 50 is circular in cross section, and provides an interior surface along which vanes 59, 60, 61, and 62, respectively, carried on rotor 53, may be "wiped" as the rotor 53 turns. Each vane is insertable into a groove 63, 64, 65, and 66, respectively, formed in the rotor 53, and is spring-biased by spring assemblies 67, 68, 69, and 70 which urge the vanes into contact with the inner surface of the housing 50.

When utilized as a compressor, shaft 54 analogous to shafts 16 and 27 of FIGS. 1 and 2 respectively is coupled to a prime mover which, in the present invention, is output shaft 42 of the gear pump 36. As shaft 54 is rotated, air is drawn in through inlet 51 and is moved by vanes 59, 60, 61, and 62 to outlet 52. Air pressure regulating means advantageously is attached to the housing 50 at outlet 52 to regulate the pressure to which air must be compressed prior to being released. Such means may take the form of a control valve, such as 34 of FIG. 2. Air exiting this control valve may be contained, still under pressure, in a holding tank provided with a pressure relief valve for allowing compressed air to be vented to the atmosphere at a selected pressure, and the compressed air from the holding tank may also furnish a supply of compressed air suitable for operating the automatic control system described hereinabove.

One air motor/compressor found to perform suitably in the present invention is manufactured by GAST, and is identified as model number 4AM-FRV-63A. This particular unit has eight vanes mounted to the rotor.

It should be noted that, where additional degrees of control are required, more than one positive-displacement fluid activated element, such as motors 12 and 23, may be used in flow lines carrying diluted polymer solutions.

It should also be noted that variations in concentration in the aqueous PHPA solution, and external factors such as ambient temperature, may affect the limits to which flow resistance may be applied without causing an undue amount of polymer degradation. Use of the before-described apparatus may be varied to take such factors into account, and it may be more efficacious under such circumstances to utilize several such flow devices simultaneously, rather than a single device.

While the foregoing description has presented specific aspects of preferred embodiments of the present invention, it is to be understood that these embodiments have been presented by way of illustration only and not by way of limitation. It is expected that others skilled in the art will perceive differences which, while varying from the foregoing, do not depart from the spirit and scope of the invention as herein described and claimed.

I claim:

1. A system located at ground level for preparing an aqueous solution of a partially hydrolyzed polyacrylamide and injecting the solution into an input well of an oil-bearing subterranean formation, said system including polymerization apparatus, hydrolyzation apparatus and dilution apparatus, said system further including flow control apparatus located downstream from the dilution apparatus of the system and upstream with relation to the input well of the oil-bearing subterranean formation for controlling the flow of the aqueous solution of the partially hydrolyzed polyacrylamide through a conduit while preventing or substantially minimizing degradation of the partially hydrolyzed polyacrylamide in solution, said flow control apparatus comprising:

a hydraulic motor having an inlet in fluid communication with the dilution apparatus of the system, an outlet in fluid communication with the input well of the oil-bearing subterranean formation and a drive means adapted to be contacted by the aqueous solution of the partially hydrolyzed polyacrylamide as it enters the inlet of the hydraulic motor, said drive means acting to bring about a pressure drop in the solution as it passes across the hydraulic motor;

output means engaged to the drive means of the hydraulic motor and movable in response to the movement of the drive means caused by said solution; and a variable load means driven by said output means and in communication with a regulator means for selectively regulating the rate at which the drive means of the hydraulic pump is caused to move by said solution, the selected flow rate being such that no, or minimal degradation, of the polyacrylamide will occur as said solution undergoes a drop in pressure as it passes across the hydraulic motor.

2. The apparatus of claim 1 wherein the variable load means is an air compressor.

3. The apparatus of claim 1 wherein the hydraulic motor is a gear motor.

4. The apparatus of claim 2 wherein the regulator means is a valve means for selectively varying the pressure to which air entering the compressor is compressed before being discharged from the compressor.

5. The apparatus of claim 1 further comprising a monitoring means in communication with the outlet of the hydraulic motor and the regulator means to automatically control the flow of the solution through the outlet of the hydraulic motor by comparing the actual flow with a desired flow and adjusting the regulator means to obtain the desired flow.

6. The apparatus of claim 5 wherein the monitoring means communicates with the outlet of the hydraulic motor via a metering means.

* * * * *